United States Patent [19]
Heminger et al.

[11] Patent Number: 5,413,441
[45] Date of Patent: May 9, 1995

[54] HYBRID ECCENTRIC WEDGE ANCHOR

[75] Inventors: David V. Heminger; David Dorr; Michael E. Berry, all of Tulsa; Dennis Chadwick, Broken Arrow; Christopher C. Martin, Tulsa; George Hailey, Owasso, all of Okla.

[73] Assignee: United Industries Corporation, Tulsa, Okla.

[21] Appl. No.: 94,245

[22] Filed: Jul. 19, 1993

[51] Int. Cl.[6] .................. F16B 13/06; F16B 39/00
[52] U.S. Cl. ........................ 411/55; 411/60; 411/107; 411/349; 411/999
[58] Field of Search ............... 411/55, 60, 61, 69, 411/349, 107, 999

[56] References Cited

U.S. PATENT DOCUMENTS

| | | | |
|---|---|---|---|
| 4,696,611 | 9/1987 | Guay | 411/349 X |
| 4,904,134 | 2/1990 | Fischer | 411/60 X |
| 5,104,141 | 4/1992 | Grove et al. | 411/999 |
| 5,211,512 | 5/1993 | Frischmann et al. | 411/55 X |

FOREIGN PATENT DOCUMENTS 1466761 12/1966 France ................... 411/60
2204592 8/1973 Germany ................ 411/55

Primary Examiner—Neill R. Wilson
Attorney, Agent, or Firm—Scott R. Zingerman; Frank J. Catalano; John D. Gassett

[57] ABSTRACT

A hybrid eccentric wedge anchor includes a cylindrical anchor body, an eccentric wedge unit, and cylindrical leading end. The eccentric wedge unit includes a tapered body, a shoulder between the tapered body and the anchor body, and a crescent shaped clip rotatably positioned around the tapered body. The longitudinal axis of the tapered body is different from the longitudinal axis of the anchor body. The shoulder varies in width around the circumference of the anchor body. As the crescent shaped clip rotates around the tapered body, its outer circumference varies from being flush with the outer circumference of the cylindrical anchor body to extending beyond the outer circumference of the cylindrical anchor body.

The hybrid eccentric wedge anchor can be configured in many useful anchor forms having the eccentric wedge unit. Examples include, but are not limited to, expansion bolt or drop-in configurations.

20 Claims, 4 Drawing Sheets

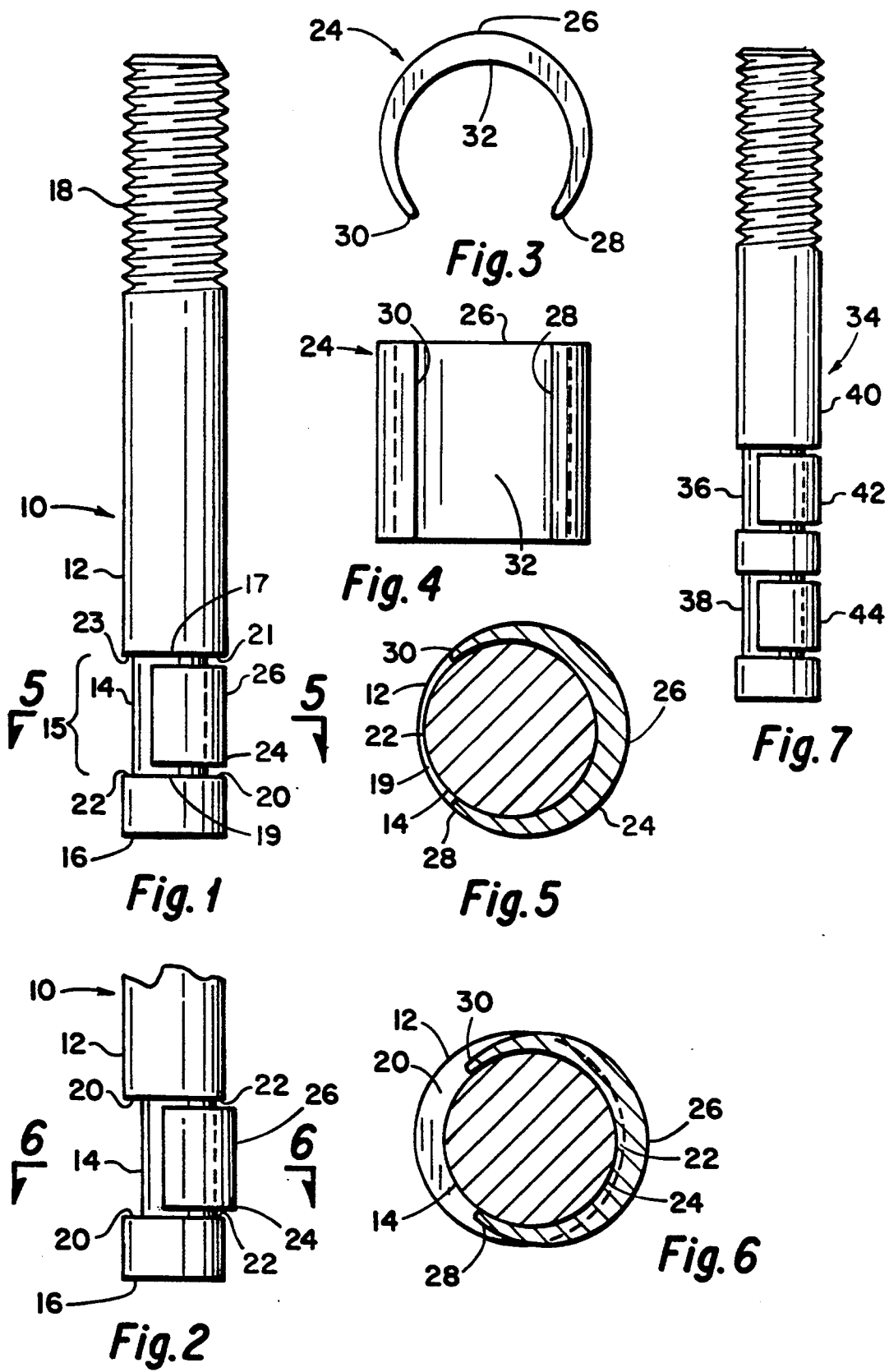

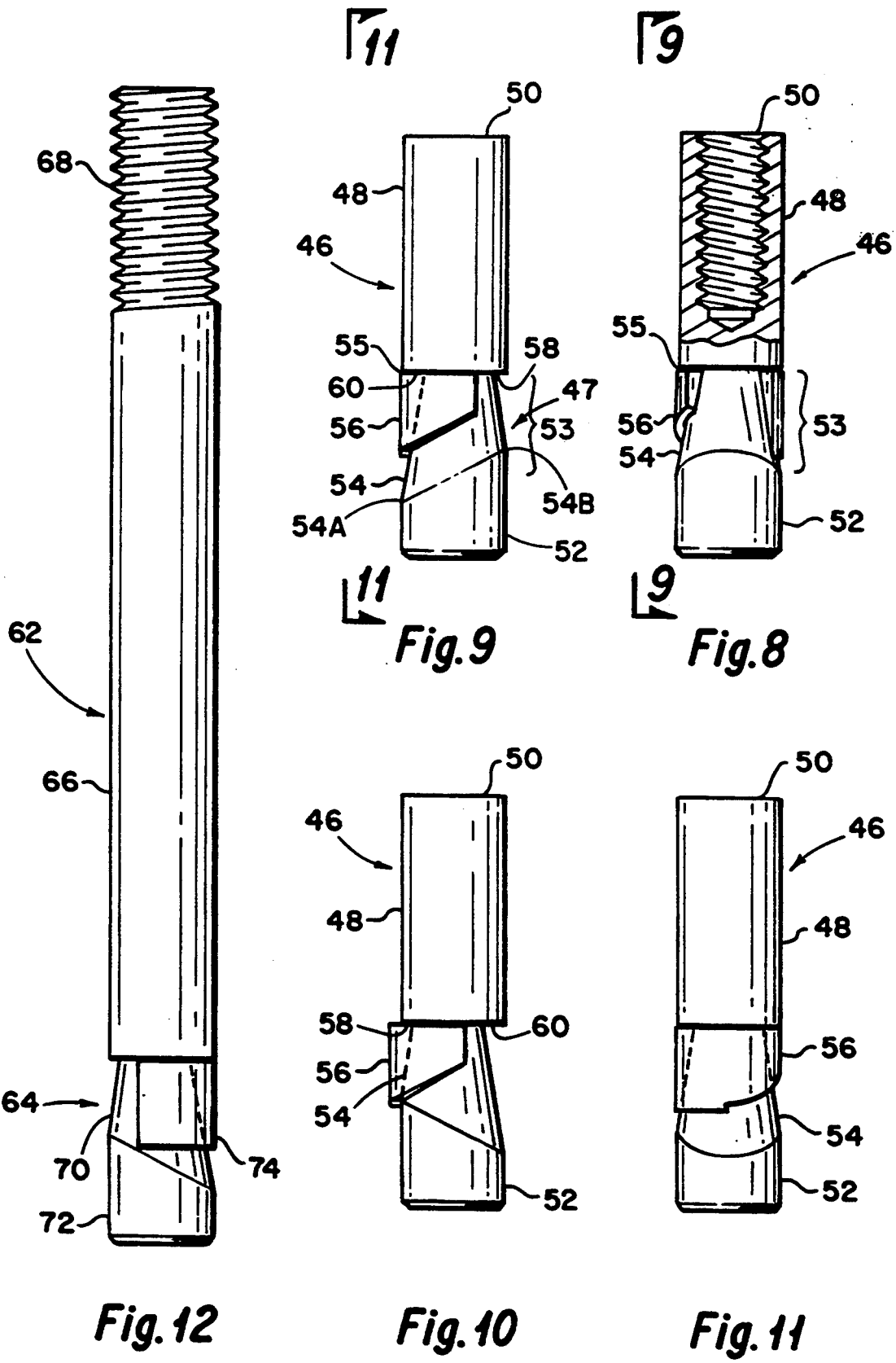

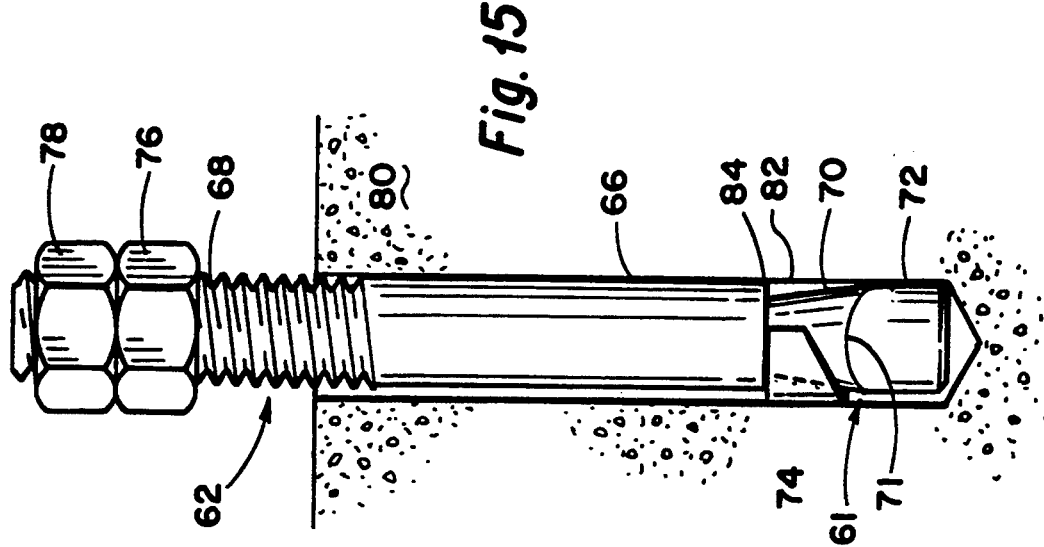
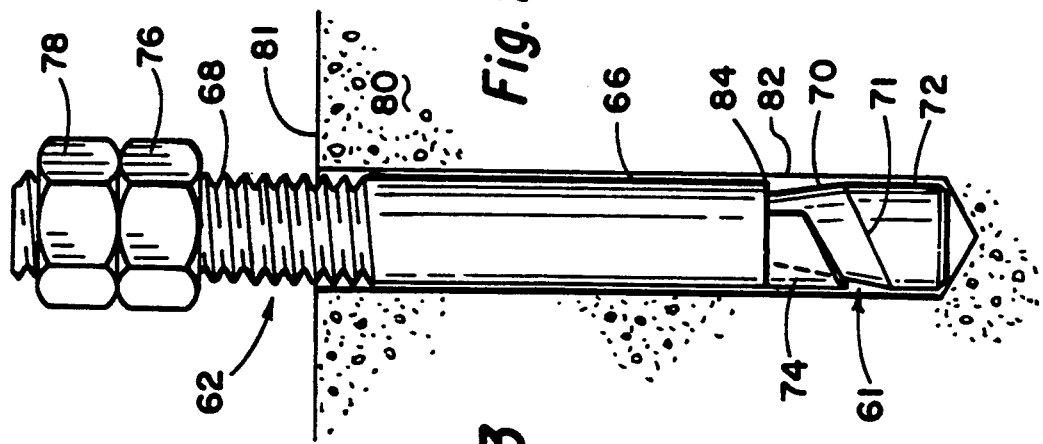
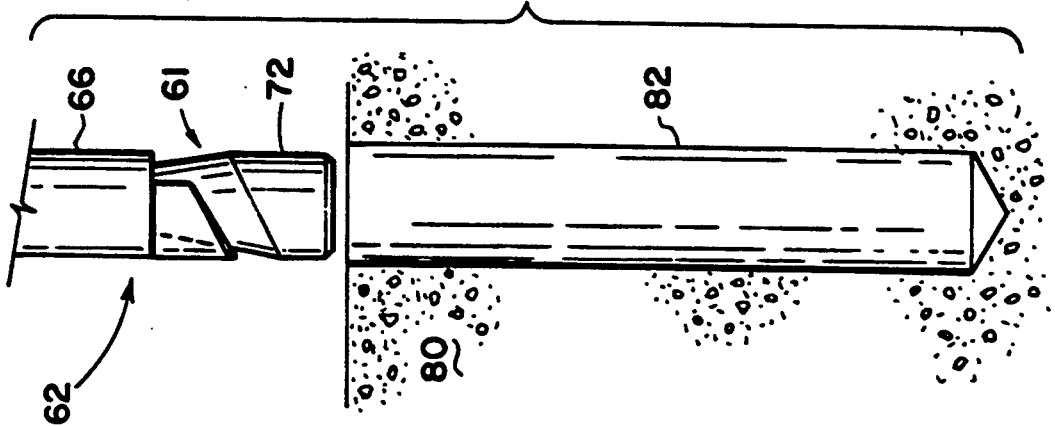

HYBRID ECCENTRIC WEDGE ANCHOR

BACKGROUND OF THE INVENTION

1. Field of the Invention

This invention relaters to concrete wedge anchors for construction and industrial applications.

2. Description of the Related Art

Concrete anchors are presently used in medium to heavy-duty construction and industrial applications to fasten machinery and equipment to masonry or concrete structures. Two general types of concrete anchors exist: Cast-in-place and retrofit. Cast-in-place anchors consist of a fastener cast within the concrete prior to curing, and retrofit anchors consist of a fastener installed after the concrete has sufficiently cured.

Three classes of retrofit anchors can be used: Bonded, undercut, and mechanical. A bonded anchor involves use of a type of bonding agent that bonds a fastener to the concrete, an undercut anchor consists of a specially shaped hole which allows a fastener to bear against, and a mechanical anchor consists of some sort of expansion mechanism that causes friction to support a load. All classes utilize a pre-drilled hole in the anchoring material.

Two different types of mechanical anchors are used in medium to heavy-duty applications: Torque controlled and displacement controlled. A torque controlled expansion anchor (typical expansion anchor) consists of wedging elements that are recessed within the anchor diameter. It is generally inserted with a nut and washer into a pre-drilled hole slightly larger than the anchor diameter until the nut and washer touch the concrete. Upon insertion, tightening of the anchor by rotating the nut clockwise draws the anchor away from the bottom of the hole. As the anchor draws up, the wedging elements engage into the sides of the concrete hole causing a wedging action, that supports an applied load. Typically, these expansion anchors have superior holding capacities over displacement controlled anchors and are easy to install, but they do not remain flush with the concrete and are very sensitive to hole diameter. If the diameter of the hole is too large or if the hole is out-of-round, the wedging element may not properly contact the sides of the concrete hole. Carbide drill bits commonly used in the industry for hole preparation commonly drill a hole that is out-of-round. The extent of this condition will determine the performance (holding value) of the anchor.

Another common problem with the typical expansion anchor is that when the anchor body is inserted into the hole, the presence of voids in the concrete at the point where the wedging element is to wedge against the side wall will require the anchor body to be withdrawn the distance of that void before the wedging element will get embedment in the side wall of the hole. This means the length of anchor body which protrudes from the hole will vary from hole to hole. Excessive bolt is often undesirable, which may require a portion to be cut off.

Displacement controlled anchors (typical drop-in anchors) consist of a cylindrical tube with an internal tapered expansion wedge cut longitudinally into sections at one end and female threads at the other A tapered expansion plug that matches, or closely matches, the taper of the internal expansion wedge fits inside the cylindrical tube. The anchor is generally inserted, threaded portion last, into a pre-drilled hole slightly larger than the anchor body until it is flush with, or slightly below, the level of the concrete and bears against the bottom of the pre-drilled hole. A setting tool is then used to drive the expansion plug into the expansion wedge that causes the sectional expansion wedges to expand into the sides of the concrete. Because the expansion plug must be driven into the expansion wedge, the anchor must bear against the bottom of the pre-drilled hole to support the anchor during setting. Another common problem is that since the anchor is often set overhead, the installer must wield an often heavy sledge overhead to install the anchor.

Once the anchor is set, a bolt or other threaded member is used to connect the threaded portion of the anchor to applied loads. Friction between the expanded wedges and the concrete hole supports these loads. Drop-in anchors remain flush with the surface of the concrete; but they are extremely difficult to install, hole depth dependent, and very expensive to produce.

Therefore, a need exists in the concrete anchor industry to produce a medium to heavy-duty mechanical anchor which is easy to install, is less sensitive to hole diameter,, is not hole depth dependent, has a known displacement on loading, is less sensitive to voids in,the concrete, has superior holding capacities, remains flush with (or below) the surface level of the concrete, and is less expensive to produce.

SUMMARY OF THE INVENTION

The purpose of this invention is to produce a medium to heavy-duty mechanical anchor which is easy to install, is less sensitive to hole diameter, is not hole depth dependent, is less sensitive to voids in the concrete, has superior holding capacities, remains flush with (or below) the surface level of the concrete, and is less expensive to produce.

Two similar embodiments satisfy these criteria: The basic embodiment and the preferred embodiment. The basic embodiment includes a cylindrical anchor body, an eccentric unit, and a crescent shaped clip. The eccentric unit consists of a cylindrical section which has a different longitudinal axis from that of the anchor body and upper and lower shoulders which vary in width around the circumference of the anchor body. The crescent shaped clip fits within the eccentric unit and is free to rotate about the cylindrical section. Since the longitudinal axis of the eccentric unit is different from the longitudinal axis of the anchor body, the eccentric unit acts as a cam upon the crescent shaped clip. As the anchor body rotates, the outer circumference of the anchor body at the eccentric unit ranges from near-flush to far-from-flush. The total diameter of the anchor, measured at the eccentric unit, ranges from near the anchor body diameter to far-from-near the anchor diameter.

To install the anchor, the crescent shaped clip is positioned so that the eccentric unit is near flush with the outer circumference of the anchor body. It is then installed into a pre-drilled hole is slightly larger than the anchor diameter and then rotated. Since the crescent shaped clip remains stationary, when the anchor body is turned the eccentric unit acts as a cam and forces the crescent shaped clip to expand the circumference of the anchor body. The increase in circumference causes the anchor body to wedge into the concrete. Friction between the crescent shaped clip and the concrete supports the loads applied to the anchor.

Because simply rotating the anchor body sets the anchor, this embodiment has the advantage of being easily installed. In addition, the anchor can easily be removed by simply rotating the anchor body counterclockwise.

The hybrid embodiment (or the preferred embodiment), which may be called a hybrid eccentric wedge, also consists of the cylindrical anchor body, an eccentric unit, and a crescent shaped clip. The eccentric unit, however, consists of a tapered wedge rather than a cylindrical body, which has a longitudinal axis different from the longitudinal axis of the anchor body. There is an upper shoulder of the tapered wedge which varies in width around the circumference of the anchor body. Since the eccentric unit is tapered, there is no lower shoulder as in the basic embodiment. The crescent shaped clip fits within the eccentric unit and is free to rotate. It is, however, tapered to match, or nearly match, the taper of the eccentric unit. Since the longitudinal axis of the eccentric unit is different from the longitudinal axis of the anchor body, the eccentric unit acts as a cam upon the crescent shaped clip. As the clip rotates around the circumference of the eccentric unit, the outer circumference of the anchor body at the eccentric unit ravages from near flush to far-from-flush.

To install the anchor, the crescent shaped clip is positioned so that the eccentric unit is near flush with the outer circumference of the anchor body. It is generally inserted with a nut and washer into a pre-drilled hole slightly larger than the anchor diameter until the nut and washer touch the concrete The anchor body is then rotated. Since the crescent shaped clip remains stationary, when the anchor body is turned the eccentric unit acts as a cam and forces the crescent shape clip to expand the circumference of the anchor body. Upon turning, tightening of the anchor by rotating the nut clockwise draws the anchor away from the bottom of the hole. As the anchor draws up, the wedging element engages into the sides of the concrete hole causing a wedging action. The wedging action supports the load applied to the anchor.

The hybrid (or preferred) embodiment has several advantages over the prior art. First, the anchor is less sensitive to hole diameter. Because a typical expansion anchor cannot be adjusted prior to engagement of the wedging mechanism, it is very sensitive to hole size. However, because the initial turning of the anchor body of this invention produces a clamping effect caused by the cam action of the crescent shaped clip against the eccentric unit, the expansion mechanism (crescent shaped clip) has the ability to adjust for different hole Diameters. Second, it is easier to install than a conventional drop-in. A conventional drop-in requires excessive, labor intensive pounding to drive the expansion plug through the expansion wedge. Frequently this pounding is done with a heavy sledge in overhead installations. An installation tool, however, could provide a simpler method of installing the hybrid embodiment without this pounding. Third, superior holding capacities are possible. The crescent shaped clip performs holding values that are similar to, or exceed, performance of acts similar to the expansion elements of a typical torque controlled expansion anchor. Finally, the hybrid embodiment is less expensive to produce than a conventional drop-in. Because the production of drop-ins requires the labor intensive step of cutting the expansion wedges longitudinally into sections, they are extremely expensive. Because the hybrid embodiment eliminates this manufacturing step, it would be less expensive to produce.

Both of these embodiments, the basic embodiment and the hybrid embodiment, could be utilized in either the conventional male threaded anchor or the conventional female threaded drop-in. The female-threaded embodiments have the added advantage of remaining flush or near flush, with the concrete.

Consequently, this invention satisfies the need for a medium to heavy-duty mechanical anchor which is easy to install, is less sensitive to hole diameter, is not hole depth dependent, is less sensitive to voids in the concrete, has superior holding capacities, remains flush with (or below) the level of the concrete, and is less expensive to produce.

BRIEF DESCRIPTION OF THE DRAWINGS

FIG. 1 is a side view of the eccentric anchor of one embodiment of this invention.

FIG. 2 s a partial view of the eccentric anchor of FIG. 1 with the anchor body rotated 180 degrees.

FIG. 3 is a top view f an anchor clip.

FIG. 4 is a side view,of the anchor clip of FIG. 3

FIG. 5 is a view take along line 5—5 of FIG. 1.

FIG. 6 is a view take along line 6—6 of FIG. 2.

FIG. 7 s an alternate embodiment of the eccentric anchor having two eccentric portions with clips thereon.

FIG. 8 is a view of the hybrid eccentric wedge of this invention configured as a drop-in anchor, partially cut away to reveal its inner threaded opening.

FIG. 9 is a view taken along line 9—9 of FIG. 8.

FIG. 10 is the hybrid eccentric wedge anchor of FIG. 9 with the anchor body rotated 180 degrees.

FIG. 11 is a view take along line 11—11 of FIG. 9.

FIG. 12 is the hybrid eccentric wedge anchor of this invention configured as a threaded expansion bolt.

FIG. 13 depicts the hybrid eccentric wedge anchor of FIG. 12 as it would installed in a pre-drilled masonry hole.

FIG. 14 depicts the hybrid eccentric wedge anchor of FIG. 13 fully inserted in the pre-drilled masonry hole.

FIG. 15 depicts the hybrid eccentric wedge anchor of FIG. 14 with the anchor body rotated one quarter turn.

DETAILED DESCRIPTION OF THE PREFERRED EMBODIMENT

Figure 16:
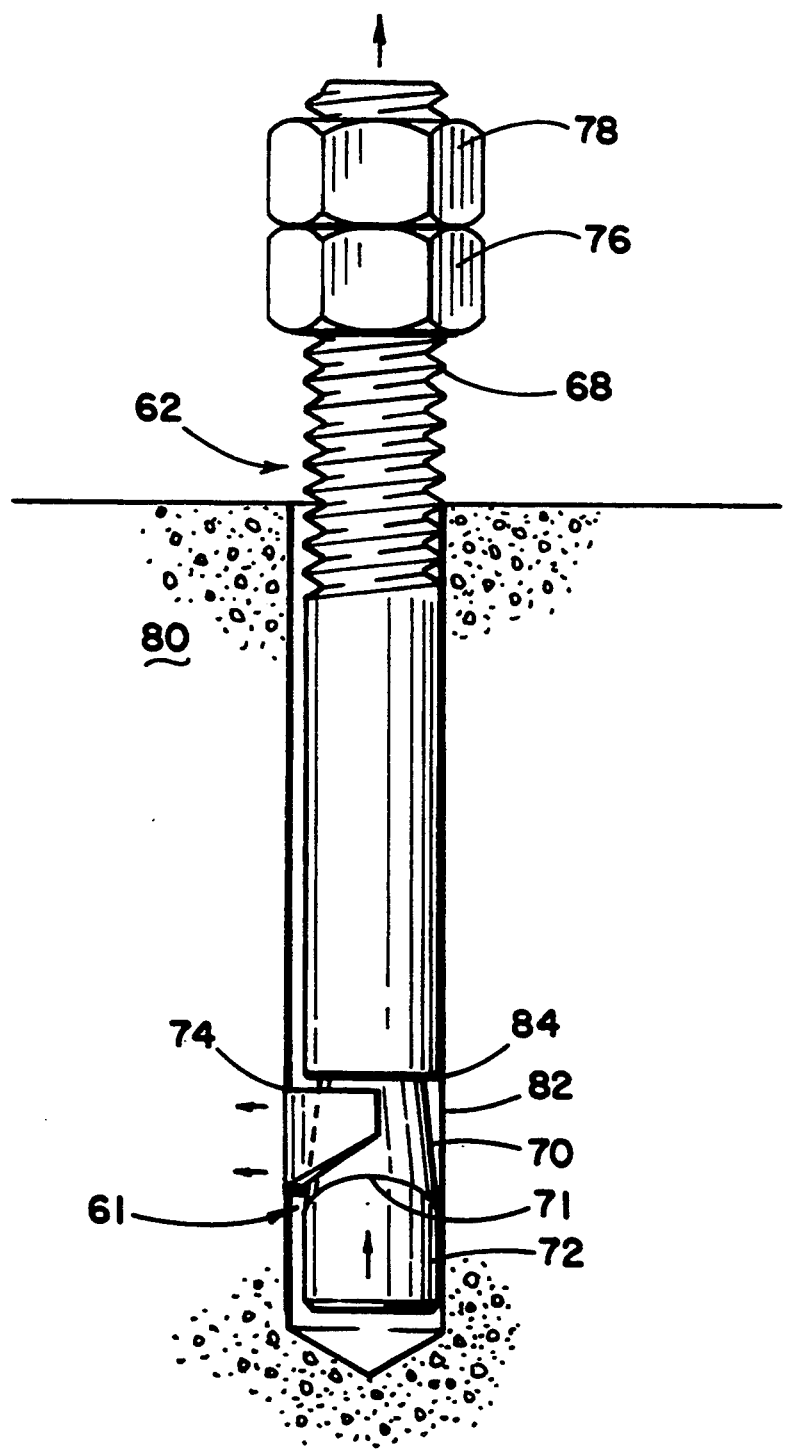
FIG. 16 depicts the hybrid eccentric wedge anchor of FIG. 15 where the anchor is placed under load and the clip is drawn over the taper.

The drawings illustrate a first or basic embodiment of this invention which may be broadly referred to as an eccentric mechanical anchor. Eccentric anchor, generally 10, is shown in FIG. 1. Shown thereon is an anchor body 12 having an eccentric unit 15 near a first end section 16. The anchor of FIG. 1 is an expansion bolt wherein the end opposite eccentric unit 15 is a threaded second end section 18. A cylindrical leading end 16 is designed to be inserted into a hole drilled in concrete of slightly larger diameter than body 12 with threaded trailing end 18 protruding therefrom.

Eccentric unit 15 is located at lower end of anchor body 12 and includes a generally cylindrical body 14 which has a different longitudinal axis from that of anchor body 12, an upper shoulder 17, a lower shoulder 19, and a clip 24 positioned around body 14. Lower shoulder 19 is wider at position 20 than at position 22.

Likewise, upper shoulder 17 is wider at position 23 than at position 21.

Clip 24 is rotatably mounted about cylindrical portion 14 (FIGS. 1 and 5) between upper shoulder 17 and lower shoulder 19. FIG. 3 is a top view of clip 24 removed from cylindrical portion 15. Clip 24 is crescent shaped such that its middle point 26 is of greater thickness than its end portions 28 and 30. The inner surface 32 of clip 24 is curved to mate the curvature of portion 14.

FIG. 4 is a side view of clip 24 looking past end portions 28 and 30 into inner surface 32.

Referring back to FIG. 1, clip 24 is positioned on eccentric body portion 14 so that its middle point of greatest thickness 26 is aligned with the point of greatest depth at position 20 of shoulder 19. At this position, the outer circumference of clip 24 is flush with the outer circumference of anchor body 12 of anchor 10.

FIG. 5 is a view taken along line 5—5 of FIG. 1 showing the position of clip 24 on body portion 14. The crescent shape of clip 24 matches the depth of eccentric unit 15 cut in body 12. The position of greatest thickness 26 of clip matches the depth of the greatest depth positions 20 and 21 in FIG. 1 so that the outer Circumference of clip 24 is flush with the outer circumference of body 12. The crescent shape of clip 24 maintains this flush relationship along eccentric unit 15.

When anchor 10 is to be used, a hole is drilled in the concrete (into which anchor 10 is to be inserted) of a diameter slightly larger than the outer diameter of body 12. For insertion into the concrete, clip 24 is initially positioned on eccentric body 14 in the orientation of FIGS. 1 and 5 so that the outer circumference of clip 24 is flush with the outer circumference of body 12. In this orientation, anchor 10 is inserted into the hole drilled into the concrete.

In FIG. 2, a partial View of the first end section 16 of anchor 10 of FIG. 1, body 12 is rotated 180 degrees from the orientation shown in FIG. 1. In operation, when body 12 is rotated, clip 24 rides about body 15 from the points of greatest depth 20 and 21 to the points of least depth 22 and 23. Eccentric body 14 thereby acts as a cam on clip 24 and the outer circumference of clip 24 extends beyond, or far-from-flush with, the outer circumference of body 12.

FIG. 6, a view taken along line 6—6 of FIG. 2 shows this orientation. Body 12 has been rotated 180 degrees from its position shown in FIG. 5. In the orientation of FIG. 6, the middle point of greatest thickness 26 of clip 24 is positioned over the points of least depth 22 and 23 shown in phantom. In this orientation, the outer circumference of clip 24 extends beyond, or far-from-flush with, the outer circumference of body 12.

After anchor 10 is inserted into the concrete hole in the orientation of FIGS. 1 and 5, body 12 is rotated in the manner shown in FIGS. 2 and 6 where the outer circumference of clip 24 extends beyond, or far-from-flush with, the outer circumference of body 12, thereby wedging anchor 10 in the concrete hole.

This basic embodiment is useful for lighter duty applications than the preferred embodiment. Anchor 10 of FIG. 1 will have different failure characteristics than the hybrid eccentric wedge anchor (preferred embodiment). Anchor 10 will drag the entire length Of the hole before it is pulled completely out. This is an improvement over existing anchors which will mechanically fail some time prior to being completely pulled from the hole. The holding values of this anchor are the same for almost the entire length of the hole until anchor 10 is pulled completely out.

A unique feature of the anchor of this basic embodiment is that it is capable of being removed if desired. To remove, the procedure is reversed, the anchor body 12 is rotated counterclockwise to position clip 24 to the point where the external circumference is equal to the external circumference of body 12 as when inserted into the drilled concrete hole (FIGS. 1 and 5). The anchor is then pulled from the hole.

It should be noted that anchor 10 of FIG. 1 could be configured as a drop-in with internal threads in body 12 rather than threaded second end section 18.

FIG. 7 depicts another alternate embodiment of the basic design wherein anchor 34 has two eccentric body portions 36 and 38 on its body 40. Anchor 34 has two clips 42 and 44 that ride freely on eccentric body portions 36 and 38. This embodiment functions in the same manner as anchor 10 in FIG. 1. It is obvious that further eccentric portions and clips could be added to body 40 in addition to the two depicted.

In a preferred arrangement, the eccentric undercut portion and clip are configured so as to incorporate the eccentric and apply that concept to a wedge anchoring system. The resultant hybrid eccentric wedge anchor produces superior holding values.

The preferred embodiment of this hybrid eccentric wedge anchoring system is configured as shown in FIGS. 8–15. The eccentric wedge concept could be utilized with a threaded expansion bolt system as shown in FIGS. 12–15 or utilized in a modified drop-in anchor type as shown in FIGS. 8–11.

FIG. 8 is a side view partially cut-away of an improved drop-in anchor, generally 46, using the hybrid eccentric wedge system. The body of drop-in 46 is cut away to reveal internal threads. Drop-in anchor 46 is designed to be inserted into a pre-drilled hole in concrete commonly overhead where its threaded opening 50 Would be flush with, or slightly below, the surface of the hole.

In this embodiment of the present invention, drop-in 46 terminates with circular leading end section 52 which corresponds in diameter to the diameter of body of drop-in 46 has a generally cylindrical configuration. An eccentric wedge unit 53 is positioned between cylindrical leading end section 52 and body 48. Eccentric wedge unit 53 includes a tapered segment 54 which has a different longitudinal axis from that of anchor body 48, an upper shoulder 55, and a clip 56 positioned around tapered segment 54. Tapered segment 54 is cut in body 48 of drop-in 46. Cylindrical leading end section 52 and tapered segment 54 are integral with body 46 in,that they are a unitary piece of material. A crescent-shaped clip 56 is rotatably mounted on tapered segment 54. Clip 56 is similar to clip 24 of FIGS. 3 and 4 with the exception that it is contoured to match the contour of tapered segment 54.

In FIG. 9, a view taken along line 9—9 of FIG. 8, it can be seen that tapered segment 54 is cut in body 48 of anchor 46 so that there is a point of greatest depth 60 and a point of least depth 58 as indicated on shoulder 55. The cut diminishes in depth around the circumference of body 48 from points 58 to 60, forming eccentric tapered segment 54. The segment 54 is considered to taper because its depth cut into body 48 diminishes from the point of greatest depth 58 to point 54A on cylindrical leading end section 52. Likewise, tapered segment 54 tapers from the point of least depth 58 to cylindrical leading end section 52.

Clip 56 is of the same crescent shape in its top view as clip 24 of FIG. 3. When clip 56 of FIG. 9 is rotated on tapered segment 54 so that its point of greatest thickness is aligned with the point of greatest depth 60 of tapered segment 54, the outer circumference of clip 56 is flush with the outer circumference of anchor body 48. At this point, the outer circumference of clip 56 is also flush with the outer circumference of cylindrical leading end section In FIG. 10, anchor body 48 is rotated 180 degrees. At this orientation, the point of greatest thickness of clip 56 is now positioned over the point 58 of least depth of tapered segment 54. Tapered segment 54 in this rotation acts as a cam on clip 56 forcing the outer circumference of clip 56 beyond, or far-from-flush with, the outer circumference of body This rotation likewise forces the outer circumference of clip 56 beyond the outer circumference of circular leading end section 52 since the diameter of body 48 is the same as the diameter of circular leading end section 52.

Tapered segment 54 is integral with and contoured around the circumference of body 48 where it meets circular leading end section 52 as can be Seen in FIGS. 8–11.

FIG. 11, a view taken along line 11—11 of FIG. 9, shows another view of clip 56 on tapered segment 54.

A setting tool (not shown) is then employed in order to set the anchor. An efficient design for a tool to accomplish this purpose is a bolt threaded on both ends. The first end of the bolt is threaded to, match the threads of opening 50 and the second is threaded to receive two nuts. In order to set anchor 46, the first end of the bolt is threaded into hole 50 and the two nuts are threaded on the second end of the bolt to where the top nut is against the lower one which prevents it from further rotation of the bolt (similar to nuts 76 and 78 of FIG. 16). The top not is then rotated clockwise which likewise rotates body 48 inside clip 56. Body 48 thereby acts as a cam upon clip 56 extending the outer circumference of the anchor body at the eccentric unit from being flush to far-from-flush. This action presets (or wedges) anchor 46 against the sides of the concrete hole.

Completion of the setting operation is accomplished by threading the lower nut into contact with the surface of the concrete. Further turning of the lower nut draws body 48 from under clip 56, forcing it over tapered segment 54 and partially onto cylindrical leading end 52. Drop-in anchor 46 is thus set in the hole. The threaded bolt is then removed from threaded opening 50 and replaced with a load bearing mechanism. The ability to set drop-in anchor 46 in this manner alleviates the necessity of pounding a setting tool into the anchor body.

Traditionally, drop-in anchors were used for medium to heavy-duty applications. The hybrid eccentric wedge drop-in of this invention, although of a different structure, resembles a typical wedge expansion anchor in its failure behavior. Due to the eccentric wedge unit, the eccentric wedge drop-in behaves more like a typical expansion anchor in its performance (holding) and failure characteristics than a conventional drop-in. This means that the holding values of the eccentric wedge drop-in enable it to be used for heavier duty applications where a typical wedge expansion anchor would normally be used.

FIG. 12 shows the hybrid eccentric-wedge anchor of this invention but configured as a threaded expansion bolt 62. The eccentric-wedge unit, generally 64, of expansion bolt 62 is identical to the drop-in 46 of FIGS. 8–11, with a circular body 66, a tapered segment 70, a circular leading end 72, and a clip 74. Tapered segment 70 has a different longitudinal axis than body 66. Expansion bolt 62 has a longer body 66 and a threaded trailing end 68. The view of the eccentric wedge portion 64 of FIG. 12 is a side view oriented 180 degrees from eccentric wedge unit 53 of FIG. 9.

Threaded trailing end 68 may have a double nut configuration as shown in FIGS. 14 and 15 where nuts 76 and 78 are mounted on anchor body 66.

As shown in FIG. 13, a hole 82 is drilled in concrete 80 of a slightly larger diameter than the diameter of body 66 of expansion bolt anchor 62. Circular leading end 72 of expansion bolt anchor 62 is then inserted into hole 82.

FIG. 14 shows expansion bolt anchor 62 fully inserted in hole 82 with a part of threaded trailing end 68 in hole 82, and the rest protruding from hole 82 above the surface 81 of the concrete 80.

Once inserted into hole 82, body 66 of expansion bolt anchor 62 of FIG. 15 is rotated clockwise in hole 82 until tight. This is accomplished by threading nuts 76 and 78 until they are positioned together so that nut 78 cannot rotate further on threaded trailing end 68 in the direction of nut 76. Using a wrench on nut 78, body 66 is rotated until tight. Rotating body 66 presets Clip 74 in hole 82.

When body 66 is rotated, clip 74 rides in tapered segment 70 from the point where the circumference of clip 74 is flush with the circumference of body 66 and circular leading end 72 to the point where the circumference of clip 74 extends beyond, or far-from-flush with, the circumferences of body 66 and circular leading end 72. Body 66 is thereby wedged (or preset) by the contact of clip 74 with the side wall of hole 82, and the contact of body 66 and circular leading end 72 with side wall 82. Body 66 and circular leading end 72 contact the side wall of hole 82 180 degrees from where clip 74 contacts the side wall of hole 82.

The fact that eccentric wedge unit 64 increases the diameter of body 66 in hole 82 provides this design the ability to wedge even with the presence of a void in the side wall of hole 82 at the point where clip 74 contacts the side wall of hole 82. If such a void is present, body 66 is rotated until clip 74 contacts the side wall around the internal circumference of hole 82 and tapered segment 70 cams clip 74 into wedging contact at that point.

The eccentric wedge Unit 64 provides an anchor which is not dependent upon hole diameter. Since the eccentric wedge unit substantially increases the diameter of body 66, irregular diameter (or out-of-round holes) often produced by carbide drill bits have little, or no, effect on the performance of the anchor. The ability to preset the eccentric wedge ensures proper embedment of the clip in the hole.

Once clip 74 is preset in hole 82 (as in FIG. 15), nuts 76 and 78 are separated so that they may be rotated on trailing end 68. Nut 76 is threaded to contact surface 81 of concrete 80 and then tightened to place load on expansion bolt 62. When nut 76 contacts Concrete surface 81, further turning draws body 66 up from the bottom of hole 82 and from under clip 74 since clip 74 is set, or wedged, into the side wall of hole 82. Turning nut 76 also forces clip 74 to a position below the angle 71 of the tapered segment 70 and partially onto circular leading end 92 which firmly embeds clip 74 into the side wall of hole 82.

Clip 74 could be designed with dimples, or bent edges, to provide friction between clip 74 and hole 82 to ensure that clip 74 remains stationary as body 66 is turned. The dimples are not compressed upon installation because eccentric wedge unit 64 alleviates the requirement of pounding expansion bolt anchor 62 into hole 82. It is understood that dimples could be placed on all embodiments of the present invention.

By employing and eccentric wedge unit, such as 64, and gauging the thickness of the minimum diameter of tapered segment 70, it is possible to produce an anchor with predictable failure characteristics.

While the invention has been described with a certain degree of particularity, it is manifest that many changes may be made in the details and construction without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A concrete anchor, comprising:
   an elongated body having a longitudinal axis, a first end and a second end;
   said elongated body being a unitary piece of material and having a substantially uniform diameter;
   at least one eccentric unit cut into said body, said unit having a section having longitudinal axis not aligned with the longitudinal axis of said body;
   a clip mounted on said section, said clip having a longitudinal dimension not greater than the longitudinal dimension of said section;
   said clip including a middle portion and two end portions with said middle portion having a greater thickness than said end portions.

2. An anchor as defined in claim 1 including a second eccentric unit spaced from said at least one eccentric unit and a second clip mounted about said second eccentric unit.

3. An anchor as defined in claim 1 including means to rotate said body.

4. An anchor as defined in claim 3 in which said means to rotate includes threads on the first end of said body and at least one nut thereon.

5. An anchor as defined in claim 3 including a threaded hole opening to the first end of said body.

6. An anchor as defined in claim 3 having a specified holding value and capable of bearing a maximum load before failure wherein said second end is inserted into a pre-drilled concrete hole such that when the body is rotated and placed under a load which exceeds the maximum load, the holding value of the anchor will remain approximately constant for the entire length that the body is pulled out of the concrete hole.

7. An anchor as defined in claim 1 wherein said clip contains dimples thereon.

8. A concrete anchor, comprising:
   an elongated body with a longitudinal axis and having first and second ends;
   an eccentric unit, said unit having a tapered segment being substantially a frustum including an axis, a small end, and a base end wherein the axis of the frustum lies at an angle to the axis of the anchor and the small end of the frustum is concentric with the axis of the anchor thereby providing a tapered eccentric caming surface;
   a clip mounted about said eccentric unit.

9. An anchor as defined in claim 8 including means to rotate said body.

10. An anchor as defined in claim 9 in which said means to rotate said body includes a threaded section on the first end of said body farthest from said eccentric unit and at least one nut on said threaded section.

11. An anchor as defined in claim 8 for use in a hole drilled in concrete including means to move said body in a direction away from the bottom of said hole.

12. An anchor as defined in claim 11 in which said means to move includes a nut threadedly mounted on the end of said body which does not enter said hole.

13. An anchor as claimed in claim 8 including a threaded hole opening to the end of said body in the end which is closer to the small end of said frustum than to the base end thereof.

14. An anchor as defined in claim 13 in which said means to rotate includes a bolt having a threaded first end and a second end, said threaded first extending into said threaded hole.

15. An anchor as defined in claim 14 in which said second end of said bolt is threaded and at least one nut is threaded thereon.

16. An anchor for use in a concrete hole, comprising:
   an elongated body with a longitudinal axis and having first and second ends;
   an eccentric unit, said unit having a tapered segment being substantially a frustum including art axis, a small end and a base end wherein the axis of the frustum lies at an angle to the axis of the anchor and the small end of the frustum is concentric with the axis of the anchor thereby providing a tapered eccentric caming surface;
   a clip mounted about said eccentric unit;
   a hole opening to the first end of said body in the end which is closer to the small end of said frustum than to the base end thereof;
   means to rotate said anchor body;
   means to move said body in a direction away from the bottom of said hole.

17. An anchor as defined in claim 16 wherein the hole opening to the first end of said body is threaded and the means to rotate said anchor body includes a bolt having a threaded first end and a threaded second end with said first end extending into said threaded hole and said second end having at least one nut thereon.

18. An anchor as defined in claim 17 wherein the means to move said anchor body in a direction away from the bottom of said hole includes a second nut on said second end of said bolt.

19. An anchor for use in a concrete hole, comprising:
   an elongated body with a longitudinal axis and having first and second ends;
   an eccentric unit, said unit having a tapered segment being substantially a frustum wherein the axis of the frustum lies at an angle to the axis of the anchor and the small end of the frustrum is concentric with the axis of the anchor thereby providing a tapered eccentric caming surface;
   a clip mounted about said eccentric unit;
   said second end of said body having threads and at least one nut thereon;
   means to move said body in a direction away from the bottom of said hole.

20. An anchor as defined in claim 19 wherein the means to move said body in a direction away from the bottom of said hole includes a second nut on said second end of said body.

* * * * *